United States Patent [19]

Tallman

[11] Patent Number: 5,115,502
[45] Date of Patent: May 19, 1992

[54] METHOD AND APPARATUS FOR DETERMINING INTERNAL STATUS OF A PROCESSOR USING SIMULATION GUIDED BY ACQUIRED DATA

[75] Inventor: James L. Tallman, Hillsboro, Oreg.

[73] Assignee: Tektronix, Inc., Beaverton, Oreg.

[21] Appl. No.: 246,046

[22] Filed: Sep. 19, 1988

Related U.S. Application Data

[62] Division of Ser. No. 667,687, Nov. 2, 1984, Pat. No. 4,813,009.

[51] Int. Cl.$^5$ .............................................. G06F 11/00
[52] U.S. Cl. ................................. 395/500; 364/264; 364/164.3; 364/276; 364/264.1; 364/DIG. 1; 371/16.1
[58] Field of Search ... 364/200 MS File, 900 MS File; 371/19, 16.1, 22.6, 27, 29.5

[56] References Cited

U.S. PATENT DOCUMENTS

| | | | |
|---|---|---|---|
| 3,644,936 | 2/1972 | Holtwick | 371/19 |
| 3,707,725 | 12/1972 | Delheim | 371/19 |
| 3,763,474 | 10/1973 | Freeman | 371/19 |
| 3,937,938 | 2/1976 | Matthews | 364/200 |
| 4,080,650 | 3/1978 | Beckett | 364/200 |
| 4,275,441 | 6/1981 | Takeuchi | 371/19 |
| 4,293,950 | 10/1981 | Shimizu | 371/21 |
| 4,312,066 | 1/1982 | Bantz | 364/200 |
| 4,429,368 | 1/1984 | Kurii | 364/200 |
| 4,470,893 | 4/1984 | Bucholz | 364/200 |
| 4,482,953 | 11/1984 | Burke | 371/19 |
| 4,503,536 | 3/1985 | Panzer | 371/25.1 |
| 4,520,440 | 5/1985 | Buonomo | 371/25.1 |
| 4,521,849 | 6/1985 | Wilder, Jr. | 364/200 |
| 4,542,505 | 9/1985 | Binoeder | 371/25.1 |
| 4,581,738 | 4/1986 | Miller | 371/25.1 |
| 4,635,193 | 1/1987 | Moyer | 364/200 |
| 4,636,940 | 1/1987 | Goodwin | 364/200 |
| 4,674,089 | 6/1987 | Poret | 364/200 |
| 4,748,556 | 5/1988 | Hoeren | 364/200 |
| 4,763,288 | 8/1988 | Deering | 371/22.4 |
| 4,796,258 | 1/1989 | Boyce | 364/900 |
| 4,802,165 | 1/1989 | Ream | 371/19 |
| 4,813,009 | 3/1989 | Tallman | 364/900 |

Primary Examiner—Thomas C. Lee
Assistant Examiner—Eric Coleman
Attorney, Agent, or Firm—Allston L. Jones; Boulden G. Griffith; Francis I. Gray

[57] ABSTRACT

A method and apparatus for determining the internal state of a processor without disturbing the operational environment of the processor employs a two phase process. In the first phase, external signals produced by the processor in the execution of a known program are monitored and recorded for subsequent analysis. In the second phase, the recorded information is analyzed in the light of the known characteristic of the processor, the program it was executing, and the signals recorded during the first phase. The internal state of the processor is thereby determined after the execution of each instruction. In addition, provisions are made for the specification of breakpoints, and the examination of simulated status of the processor on the occurrence of the breakpoints.

6 Claims, 5 Drawing Sheets

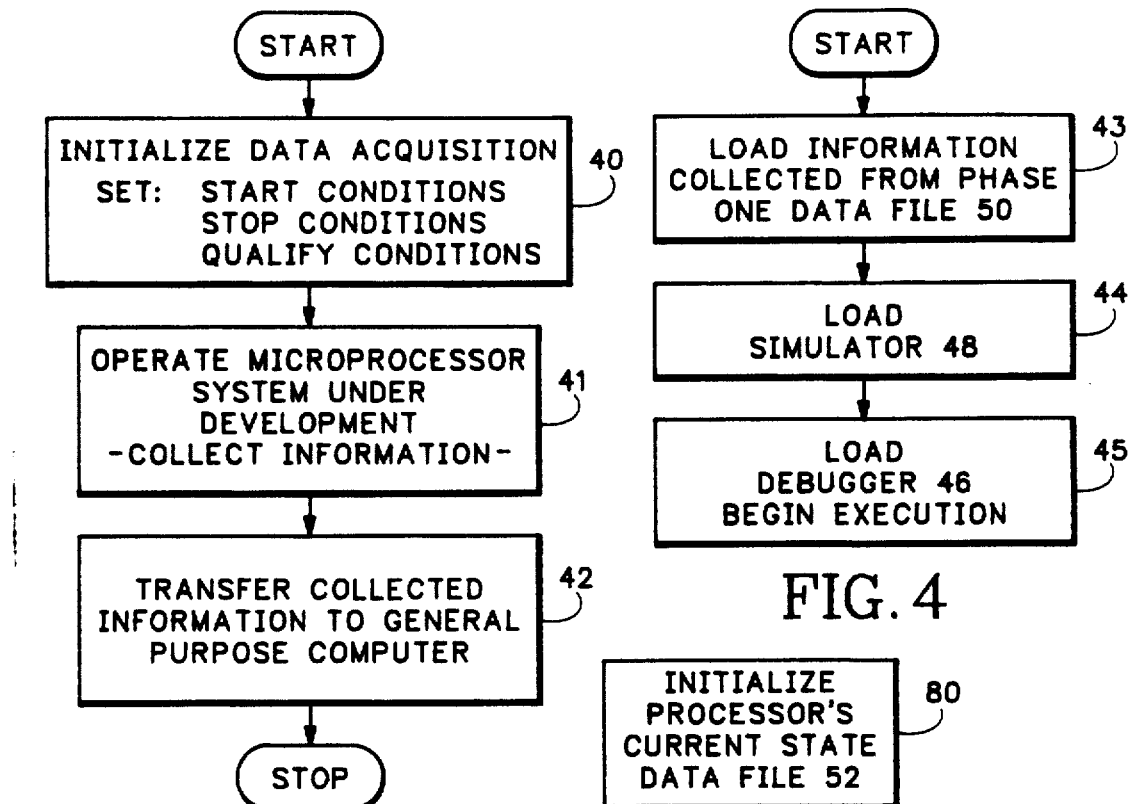
FIG. 3
FIG. 4
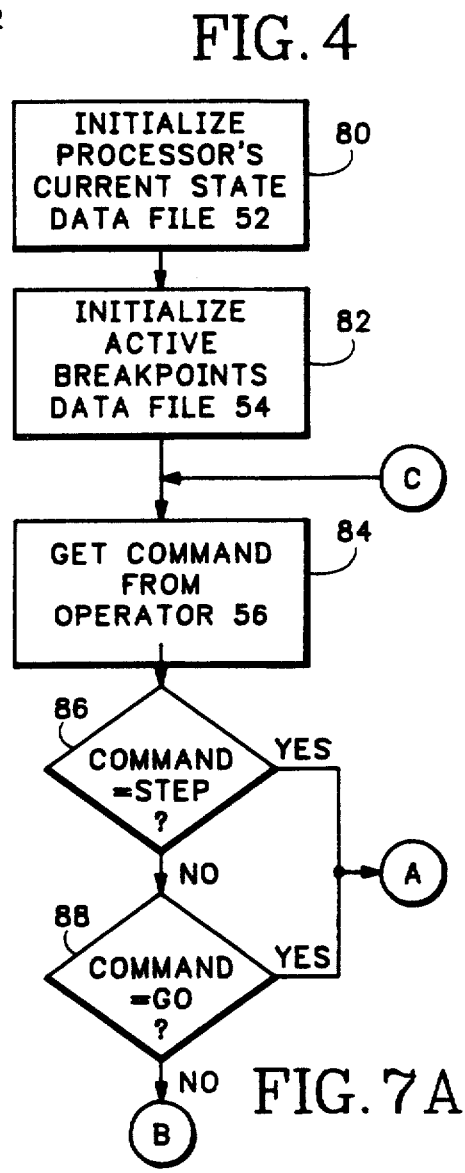
FIG. 7A

METHOD AND APPARATUS FOR DETERMINING INTERNAL STATUS OF A PROCESSOR USING SIMULATION GUIDED BY ACQUIRED DATA

This is a division of application Ser. No. 06/667,687 filed Nov. 2, 1984, now U.S. Pat. No. 4,813,009.

BACKGROUND

This invention relates to monitoring devices, and more particularly to a method and apparatus for determining the internal status of a processor without effecting the operational environment associated therewith.

Broadly speaking, a processor operates by sequentially performing a set of instructions, generally referred to as a program. The program is designed to accomplish an objective, and may reference additional information, generally referred to as data, in accomplishing the objective.

A processor may be considered as fundamentally comprising a central processing unit and a memory unit. The central processing unit basically performs desired operations pursuant to instructions and data which are stored in the associated memory unit. Typically the memory unit is comprised of many sequential unique storage locations, each of which is capable of storing a unit of information. In this regard, it should be particularly noted that the units of information stored in the memory may be either instructions to direct the operations of the central processing unit, or data which will be operated upon by the central processing unit pursuant to the instructions. As processors are complex devices, it is frequently desirable to monitor the operations of a processor, especially during the design and development of apparatus employing one or a plurality of processors. In the past this has been accomplished in a number of ways.

In one approach commonly used in central processing units constructed from discrete devices, the contents of various registers and the status of various operations which occur internal to the central processing unit are displayed by a collection of indicating devices. In some designs, each indicating device is permanently associated with a particular item of interest within the central processor, and would continuously display the associated information. This frequently results in a large collection of indicating devices of various types. Such an approach frequently further includes additional monitoring apparatus, such as instruction execution control devices. Such devices operate to provide such functions as controlling the rate at which the central processing unit performs the execution of individual instructions in a program, or halting the execution of instructions upon the occurrence of predefined conditions.

Approaches employing dedicated indicating and monitoring devices offer a number of advantages, the most significant of which provides the capability of monitoring the operation of the central processing unit without disturbing the environment in which a program may be executing. However, notwithstanding this advantage, the monitoring functions possible with such an approach are nevertheless somewhat limited. In particular, such an approach offers little detailed information regarding events which occur with respect to a program during the execution thereof. This situation becomes even more complex when a central processing unit must further respond to external events in addition to executing a particular program. In the past, this problem was addressed by the attachment of specialized monitoring equipment to the central processing unit. By way of example, if an analysis of the performance of a central processing unit in the execution of a particular program was of interest, the details of the particular program and associated parts of the central processing unit would be closely examined. In particular, the information of interest with respect to the program would first be determined. Thereafter, the associated portions within the central processor would be determined by a close examination of the internal architecture and operation of the central processor to determine the appropriate signals within the central processor which would contain the information of interest. Thereafter, signal probes would be attached to the points in the internal circuitry of the central processor to monitor the particular signals of interest. With the signal probes in place, the program of interest would then be run on the central processing unit, and the information of interest collected. The information received via the signal probes would then be processed according to the particular requirements of the monitoring task, and recorded for subsequent analysis. By subsequent analysis of the recorded information, the desired details with respect to the performance of the central processing unit in the performance of a particular program could be determined.

With the advent of the fabrication of central processing units as integrated circuits, and the accompanying limitations associated with integrated circuit packaging techniques, it has not been possible to use dedicated indicating and monitoring devices to monitor the internal operation of a central processing unit fabricated as an integrated circuit. This limitation primarily results from the physical constraint of being unable to route the large number of electrical conductors necessarily associated with dedicated indicating devices out of the integrated circuit package. With advances in the design of central processing units, the physical limitations imposed by integrated circuit packaging techniques have become even more limiting, and in some applications have operated to require multiplexing techniques to make the necessary signals available. This situation naturally makes the monitoring of the activities which occur internal to the central processing unit accordingly more difficult.

In response to the limitations imposed by integrated circuit packaging techniques, and the desire to monitor operations internal to a central processing unit, a number of alternate approaches have been taken. One such approach has been based upon hardware techniques, and a second approach has been based upon programming, or software techniques.

Generally speaking, the signals associated with a central processing unit fabricated as an integrated circuit can be broadly classified into three groups: control signals, address signals and data signals. These signals are used to electrically interface the central processing unit with the components associated therewith. Consequently, monitoring these signals can provide some indication of the fundamental operations occurring internally to the central processor unit. A number of techniques have been employed in the past based upon this approach.

In one approach, the address signals from the central processing unit are segregated into two groups, and each address signal present within each group is assigned a particular binary weight. Thereafter, a corresponding analog signal is derived for each of the signal groups having a magnitude proportional to the binary weight of the signal present on the address lines within each of the two groups. This is generally accomplished through the use of a digital-to-analog converter device. Thereafter, the two analog output signals are used to control the horizontal and vertical deflection plates of an oscilloscope. The resulting display on the oscilloscope will consequently provide some information with respect to the location in memory wherein the central processing unit is currently active. While such an approach does offer the advantage of not disturbing the operational environment within the central processing unit, the information so provided with respect to the internal operation of the central processing unit is very limited.

In yet another approach employing a visual monitoring device, each unique location in memory for a designated portion of memory is assigned a particular location on a visual monitoring device, and the contents of the associated memory location are displayed therein. Consequently, by observing the resulting visual display, it is possible to gain some insight regarding the activities of the central processor with respect to the memory.

The foregoing examples are but a few of the approaches which have been employed in the past to gain insight on the internal operations of a central processing unit by monitoring the various signals associated therewith. It will be observed that while each approach shares the common advantage of not disturbing the operation of a program within the central processing unit, the information provided by the monitoring technique has been somewhat limited, failing to provide comprehensive information relating to the internal operations of the central processing unit.

In yet a different approach to the monitoring problem, the central processing unit has been used to monitor itself. In such an approach, a series of programs are used to direct the central processing unit to monitor the contents of various registers and the status of events occurring internal to the central processing unit, and thereafter to report the results.

In one such approach the central processor operates under the control of a control program, often referred to as a "monitor program". Operating under the control of the monitor program, the central processing unit performs selected instructions present in the particular program of interest under the strict control of the operator of the central processing unit. In such an approach, it is possible for the operator to exercise greater control over the activities of the central processing unit than would otherwise be possible. Such control activities would normally include control over the execution of the sequence of instructions, e.g., executing instructions on a one-by-one basis, or executing instructions in groups. At any point in the execution process, it would be possible to monitor the internal state of the central processing unit, and report the status to the operator. Other control activities would include the ability to individually examine, and if necessary change, the contents of any location in the memory unit. By employing the approach of using the central processing unit to monitor itself, much greater control and monitoring of the activities of the central processing unit is possible. By using such an approach, the monitoring of parameters internal to the central processing unit is frequently limited only by the complexity of the monitor program itself.

However, notwithstanding the advantages presented by using the central processing unit to monitor itself, such an approach has an inherent shortcoming which is fundamental to the process. In particular, the basic environment existing during the execution of program instructions is disturbed. This follows from the fact that the central processing unit must not only execute the program of interest, but must also execute the monitor program. By so executing the monitor program, the central processing unit is performing tasks that it otherwise would not do if it were executing the program alone. Such a shortcoming can present disadvantages of varying scope. One such disadvantage is in the time required for the execution of the program of interest. Since the central processing unit is having to execute both the program of interest as well as the monitor program, additional execution time is clearly required. While they may be acceptable under some conditions, it can be most undesirable under others. In particular, in an application in which it is desired to monitor an environment wherein the central processing unit must not only execute a program of interest, but must also respond to events which are occurring external to the central processing unit, the imposing upon the central processing unit of the additional task of executing the monitor program can significantly alter the basic environment which is desired to be monitored. This result follows from the fact that the time which the central processing unit would otherwise dedicate to the program of interest and responding to events which are occurring external to the central processing unit is reduced by the amount of time required by the central processor to perform the appropriate portions of the monitor program. Consequently such an approach has the serious shortcomings of disturbing the environment which is desired to be monitored.

A yet further approach is taken with current logic analyzer type devices. In particular, signal probes associated with a logic analyzer are coupled to the signals produced by a microprocessor: the control signals, the address signals and the data signals. The logic analyzer then operates to monitor the foregoing signals, and can be further configured to indicate the occurrence of certain pre-defined conditions with respect to the signals monitored. In addition thereto, it is possible to determine the internal status of the monitored processor device through the use of a type of monitor program to effect a dump of the status of internal registers within the processor. This procedure is commonly referred to as "signal stepping" the processor, and consists of the execution of an associated dump routine. The dump routine consists of a group of instructions which must be executed after each instruction of the monitored program, and consequently seriously degrades the performance of the processor. In particular, such a procedure further completely disrupts the internal program execution environment within the processor, and makes it impossible to diagnose problems associated with real-time operation.

One approach currently taken to achieve visibility of the internal status of registers with the processor without disturbing the operating environment requires the reconstruction of the entire processor. This reconstructed processor is frequently fabricated with commonly available logic chips. While such an approach will provide the desired information without disturbing the internal operational environment, a number of serious shortcomings are unavoidable with such an approach. In particular, the discrete reconstructed version of the processor is necessarily fabricated on some type of circuit board, and consequently presents an environment of relatively high capacitance between connections of the logic elements. The charging and discharging of these capacitances with changes in the states of the associated logic signals results in a severe limitation on the maximum speed at which the reconstructed processor is capable of operating. This necessarily results in a lower maximum operating speed for the reconstructed processor. The lower operating speed naturally introduces an undesired operating condition for monitoring purposes.

A yet different approach likewise currently taken to achieve visibility of the internal status of registers within a processor without disturbing the operating environment requires the design of a second version of the processor providing bonding pads for the desired signals and register status. This technique is commonly referred to as a "bond-out" chip, and necessarily has associated with it a requirement of a processor design team. From a practical standpoint, the bond-out approach is generally a very expensive alternative not only from a financial standpoint, but likewise from a time and human resources standpoint.

From the foregoing it is observed that while the first basic approach involving the monitoring of the signals from the central processing unit functions in a manner transparent to programs which the central processing unit may be executing, such an approach provides very limited information regarding the particular operations occurring internally to the central processing unit.

In a similar manner, it is observed that while the second basic approach involving using the central processing unit to monitor itself does provide more detailed information regarding the internal operations of the central processing unit, such an approach has the disadvantage of disturbing the environment in which programs execute within the central processing unit.

In addition to the foregoing observations, currently available alternatives to achieve visibility of internal processor status present serious practical implementation limitations.

SUMMARY OF THE INVENTION

In accordance with the present invention, a method and apparatus is disclosed which provides for the monitoring of the internal status of a processor without disturbing the environment within the processor. Broadly stated, the foregoing objectives are achieved by monitoring and recording the external signals associated with a processor which result from the execution of a particular program. Thereafter, the recorded signals are analyzed in light of the known characteristics of the particular processor. From the foregoing analysis, the internal dynamic status within the processor is determined.

More particularly, in accordance with the present invention, monitoring apparatus is coupled to external signals associated with the processor. Broadly stated, these signals comprise control, address and data signals. Thereafter, the program of interest is executed by the processor. During the execution of the program, the associated external signals produced by the processor are recorded by the monitoring apparatus. Thereafter, the recorded information is analyzed. Broadly stated, as processors are deterministic in nature i.e., from a known initial condition and associated parameters, which in the present discussion are represented by the recorded signals, subsequent states may be determined. In particular, by analyzing the associated recorded signals in the light of information which is specific to the particular processor, e.g., the internal architecture and the instruction set associated with the particular processor employed, the internal state of the processor subsequent to the execution of each instruction may be determined. By use of such a technique, the internal state of a processor at any time may be indirectly determined. In further accordance with the method and apparatus of the present invention, selected conditions may be predefined, and the process of subsequent analysis halted upon satisfaction of such selected conditions. This provides the capability of examination of a processor's internal status at any arbitrary point in the performance of a program without disturbing the operational environment within the processor, thereby avoiding degradation of the operational environment.

DESCRIPTION OF THE FIGURES

FIG. 3 illustrates the steps in Phase One of the improved method and apparatus for determining the internal status of a processor in accordance with the present invention.

FIG. 4 broadly illustrates the steps comprising Phase Two of the improved method and apparatus for determining the internal status of a processor in accordance with the present invention.

DETAILED DESCRIPTION

Figure 1:
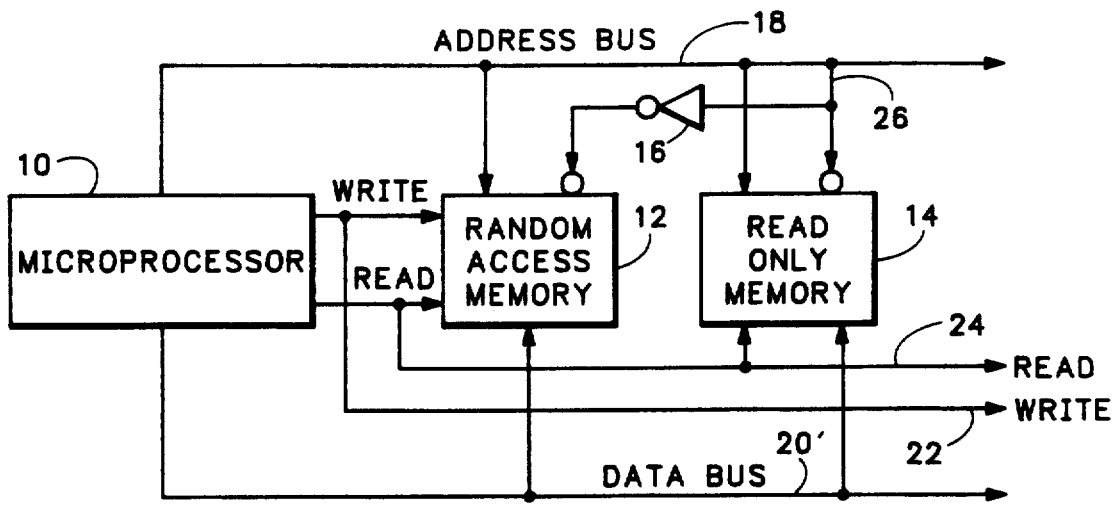
FIG. 1 illustrates a typical implementation of a microprocessor based design including a microprocessor, random access memory and read only memory.

In accordance with the present invention, a method and apparatus are disclosed which provide for determining conditions internal to a processor without disturbing the operational environment associated therewith. Broadly stated, processor devices are deterministic in nature. In particular, by knowing the characteristics associated with a particular processor, the parameters associated with a processor starting state, and the operations which the processor is to perform, a subsequent processor state may be determined. More specifically, a processor has a defined internal architecture, e.g., set of registers with defined relationships between the various registers of the processor. In addition, a processor has associated therewith a set of instructions for the manipulation of the operations of the processor, e.g., moving information among the various registers and a memory associated with the processor. In further addition, a processor necessarily has associated therewith a set of signals the generation of which is determined by the particular operations occurring internal to the processor. As each of the foregoing are well defined, the internal state of a processor resulting from the performance of a known set of instructions may be determined.

In accordance with the broader aspects of the present invention, the internal state of a processor may be determined by a two phase process. Broadly stated, the first phase may be considered as a data collection process, and the second phase may be considered as a data analysis process. In particular, the first phase consists of monitoring the activities of a processor in the execution of a known set of instructions. The second phase consists of employing the information obtained from the monitored activities along with other known information associated with the processor to determine the internal state of the processor. In accordance with the present invention, during the first phase, hereinafter referred to as Phase One, the program which the processor is to execute is first developed, and is thereafter supplied to the memory device associated with the processor. Thereafter, monitoring apparatus is coupled to the external signals associated with the processor to provide for the monitoring and recording thereof. The initial starting state of the processor is next chosen, and the internal conditions within the processor are set in conformance with the chosen set of initial starting conditions. The processor is then permitted to perform the set of instructions comprising the program the processor is to execute, and the corresponding signals produced thereby are recorded for subsequent analysis. In the second phase, hereinafter referred to as Phase Two, a set of selected conditions are first chosen. The selected conditions represent desired conditions internal to a processor, the occurrence of which are of interest. These selected conditions will hereinafter be referred to as breakpoints. By way of example, a breakpoint could be the occurrence of a particular value in a selected register, or the execution of a particular instruction. In this regard it should be understood that the foregoing are by way of illustration only, as there are indeed many different conditions internal to a processor which may be of interest. After selection of either a particular breakpoint or set of breakpoints, the first instruction previously executed by the processor is simulated, and the results of the simulation used to up-date information used to represent the internal state of the processor. Thereafter, the information used to represent the internal state of the processor is examined to determine if any of the previously selected breakpoints exist. If a previously selected breakpoint is found to exist, then appropriate action is performed according to those selected by an operator. Thereafter, the foregoing process is repeated by simulating the execution of the next instruction, and thereafter checking the resulting simulated condition against the previously selected breakpoints. By repetitively performing the foregoing sequence, the internal state of a processor may be determined.

The foregoing described process may be more fully understood by considering the following. FIG. 1 illustrates a microprocessor based design, and is composed of Microprocessor 10, Random Access Memory 12, Read Only Memory 14, Inverter 16, Address Bus 18, Data Bus 20, Write signal line 22 and Read signal line 24. Microprocessor 10 may be any of a wide variety of microprocessor type devices which are typically implemented in the form of integrated circuits. By way of illustration, typical microprocessor devices would include the model 8085 microprocessor manufactured by INTEL Corporation of Santa Clara, Calif., or the model Z-80 microprocessor manufactured by ZILOG Corporation of Cupertino, Calif. In this regard it should be understood that while Microprocessor 10 is generally implemented in the form of an integrated circuit, the particular aspects of the present invention which provide for the determination of the internal status of Microprocessor 10 are not limited to microprocessors implemented as integrated circuits, but may likewise include microprocessors implemented in yet different manners. Random Access Memory 12 provides for the temporary storage of information used by Microprocessor 10, and may be implemented by any of a wide variety of random access memory devices. Typical of such random access memory devices is the model 2115 Random Access Memory device manufactured by INTEL Corporation. Read Only Memory 14 provides for the permanent storage of information used by Microprocessor 10, and may be implemented by any of a wide variety of read only memory devices. Typical of such read only memory devices is the model 2732 Erasable Read Only Memory device manufactured by INTEL Corporation. Inverter 16 provides for the logical inversion of a single address signal from Address Bus 18, and may be implemented by any of a wide variety of devices. Typical of such inverter devices is the model 74LS04 HEX INVERTER Integrated Circuit manufactured by Texas Instruments of Dallas, Tex.

The foregoing described apparatus is typically configured in the following manner. Microprocessor 10 generally has associated therewith signals which may be broadly classified into three categories: address signals, data signals and control signals. The address signals are collectively represented in FIG. 1 by Address Bus 18, the data signals by Data Bus 20, and the control signals by Write signal on line 22 and Read signal on line 24. Address Bus 18 is coupled to Random Access Memory 12 and Read Only Memory 14, and functions to select a unique storage location contained within either Random Access Memory 12 or Read Only Memory 24 for use by Microprocessor 10. One of the address signals contained within the group of address signals comprising Address Bus 18 is typically used to select either Random Access Memory 12 or Read Only Memory 14, and is indicated generally in FIG. 1 as Address Signal line 26. In the particular implementation illustrated in FIG. 1, Address Signal line 26 is coupled to Read Only Memory 14, and further to the input terminal of Inverter 16. The output terminal of Inverter 16 is then coupled to Random Access Memory 12. In this manner, the logic state of the Address Signal on line 26 is used to select either Random Access Memory 12 or Read Only Memory 14 for operations with Microprocessor 10. Data Bus 20 from Microprocessor 10 is coupled to Random Access Memory 12 and Read Only Memory 14, and functions to transfer information between Microprocessor 10 and Random Access Memory 12 and Read Only Memory 14. Write signal line 22 from Microprocessor 10 is coupled to Random Access Memory 12, and functions to indicate that Microprocessor 10 is performing a write operation with Random Access Memory 12. In a similar manner, Read signal line 24 functions to indicate that Microprocessor 10 is performing a read operation with the particular memory device selected by Address Signal line 26. The foregoing described signals which are associated with the operation of Microprocessor 10, i.e., Address Bus 18, Data bus 20, Write signal line 22 and Read signal 24 are further made available to monitoring apparatus in accordance with the present invention, as will be more fully discussed herein.

Figure 2:
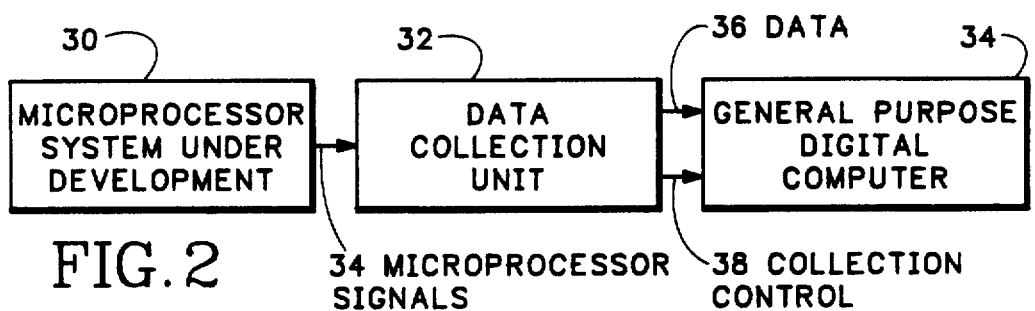
FIG. 2 broadly illustrates the relation between a microprocessor system under development, a data collection unit and a general purpose digital computer in accordance with the method and apparatus of the present invention.

FIG. 2 illustrates the interconnection of monitoring apparatus in accordance with the present invention. Referring to FIG. 2, Microprocessor System Under Development 30 broadly represents a microprocessor based system of interest. While there may be many different types of system designs, the microprocessor based system described with respect to FIG. 1 is typical of Microprocessor System Under Development 30. Data Collection Unit 32 is a device which will collect and record information produced by Microprocessor System Under Development 30, and is coupled thereto by Microprocessor Signal bus 34. While Microprocessor Signals bus 34 may carry any of a broad variety of signals, and will in fact be determined by the particular design of Microprocessor System Under Development 30 and the signals of interest associated therewith, the signals associated with the microprocessor system of FIG. 1 would be broadly illustrative of the nature of Microprocessor Signals bus 34, i.e., Address Bus 18, Data Bus 20, Write signal line 22 and Read signal 24. Data Collection Unit 32 may be any of a wide variety of apparatus designed for the collection of information. In the preferred embodiment, Data Collection Unit 32 is implemented by a Tektronix Model 1240 Logic Analyzer, as more fully described in Tektronix Model 1240 Logic Analyzer Operator's Manual, Tektronix Part Number 070-4340-00, Reference guide, Tektronix Part Number 070-464100, and Service Manuals Volume 1 and 2, Tektronix Part Numbers 070-4340-00 and 070-4717-00, which manuals are herein incorporated by reference. Data Collection Unit 32 may also be implemented by a Tektronix Model 8540 Trigger Trace Analyzer, as more fully described in Tektronix Model 8540 Trigger Trace Analyzer Operator's Manual, Tektronix Part Number 070-4947-00, Service Manual, Tektronix Part Number 070-3762-00, which manuals are likewise herein incorporated by reference. The Tektronix Model 1240 Logic Analyzer and the Tektronix Model 8540 Trigger Trace Analyzer are manufactured by Tektronix, Inc. of Beaverton, Oreg. Data Collection Unit 32 is coupled to General Purpose Digital Computer 34 by Data signals line 36 and Collection Control signals line 38. General Purpose Digital Computer 34 functions to provide a number of functions as will be more fully discussed hereinafter. In the preferred embodiment, General Purpose Digital Computer 34 is implemented by a Tektronix Model 8560 Computer, as more fully described by Tektronix 8560 Software Development Unit Operator's Manual, Tektronix Part Number 070-5050-00, and Service Manual, Tektronix Part Number 070-5066-00, which technical manuals are herein incorporated by reference. The Tektronix Model 8560 Computer is manufactured by Tektronix, Inc. of Beaverton, Or.

According to the method and apparatus of the present invention, Phase One is first performed. The steps included in Phase One are indicated broadly in FIG. 3. Referring to FIG. 3, the first step includes the Initialization of Data Acquisition, as illustrated generally by block 40. In particular, the selected starting conditions, stopping conditions and qualifying conditions are set. While the exact nature of each of the foregoing conditions will be determined by the nature of a particular design, such conditions would naturally include the set of instructions which Microprocessor 10 (FIG. 1) was to perform. After selection and development of the set of instructions for execution by Microprocessor 10, hereinafter referred to as the program for Microprocessor 10, the program is supplied to Microprocessor 10. While this may be done in any of a number of ways, in the preferred embodiment the program is supplied to Microprocessor 10 (FIG. 1) stored in Read Only Memory 14. Thereafter Microprocessor 10 is placed in a known condition. While this may be done in any of a variety of ways, including the execution of an initialization program stored in Read Only Memory 14 by Microprocessor 10, in the preferred embodiment the same is accomplished by resetting Microprocessor 10 through the use of a reset signal normally associated therewith. The resetting operation serves to start the operations of Microprocessor 10 from a known state. In a similar manner, the conditions upon which to terminate the operations of Microprocessor 10 are determined, as are associated qualifying conditions on the collection of information relating to the operation of Microprocessor 10. Thereafter, as illustrated generally by block 41 of FIG. 3, Microprocessor 10 is placed in operation, and the signals generated in the operation thereof are monitored. In particular, the signals associated with the operation of Microprocessor 10, i.e., Address Bus 18, Data Bus 20, Write signal line 22 and Read signal line 24 are monitored by Data Collection Unit 32 (FIG. 2). After the operation of Microprocessor 10 has been halted, the information collected as above described is transferred from Data Collection Unit 32 to General Purpose Computer 34, as indicated by block 42 of FIG. 3, and stored in a data file, hereinafter referred to as Information Collected From Phase One Data File. This completes Phase One.

Thereafter, the data analysis process of Phase Two is initiated. FIG. 4 broadly illustrates the steps comprising Phase Two. Referring to FIG. 4, the information previously collected during Phase One is first transferred into General Purpose Digital Computer 34 (FIG. 2) in block 43. Thereafter Simulator 48 is likewise transferred into General Purpose Digital Computer 34 in block 44, as will be more fully discussed hereinafter. Thereafter in block 45 Debugger 46 is likewise transferred into General Purpose Digital Computer 34, after which General Purpose Digital Computer 34 is directed to begin execution of Debugger 46, as will be more fully discussed hereinafter.

Figure 5:
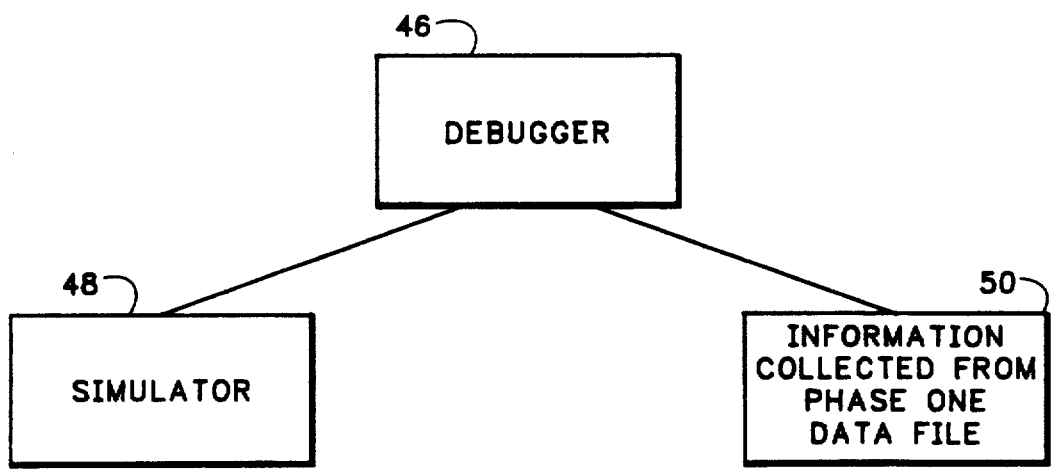
FIG. 5 illustrates the hierarchical relationship between the Debugger, Simulator and Data Collected in Real Time in Phase One in accordance with the present invention.

The operation of Phase Two, i.e., the data analysis process, can be more fully understood by first referring to FIG. 5. FIG. 5 represents the relation between Debugger 46, Simulator 48 and Information Collected From Phase One Data File 50. Referring to FIG. 5, Debugger 46 broadly represents a control function which occurs during Phase Two, and serves to orchestrate the operations occurring during Phase Two with the operations of Simulator 48 and Information Collected From Phase One Data File 50. In particular, Information Collected From Phase One Data File 50 represents the information which was collected during the operation of Microprocessor System Under Development 30 (FIG. 2) by Data Collection Unit 32 in Phase One. Simulator 48 is a device which simulates the operation of the microprocessor contained in Microprocessor System Under Development 30, and may be any of a wide variety of microprocessor simulation devices configured to simulate Microprocessor 10. Broadly stated, Debugger 46 would begin by taking the first instruction which Microprocessor 10 would execute, and pass said instruction to Simulator 48. Thereafter, Simulator 48 would simulate the performance of said instruction by Microprocessor 10, thereafter returning control to Debugger 46. The results of the performance of the single instruction would then be compared with a set of predefined conditions of interest, as will be more fully discussed hereinafter. In a similar manner, each subsequent instruction which was previously executed by Microprocessor 10 as stored in Information Collected From Phase One Data File 50 would be performed.

Figure 6:
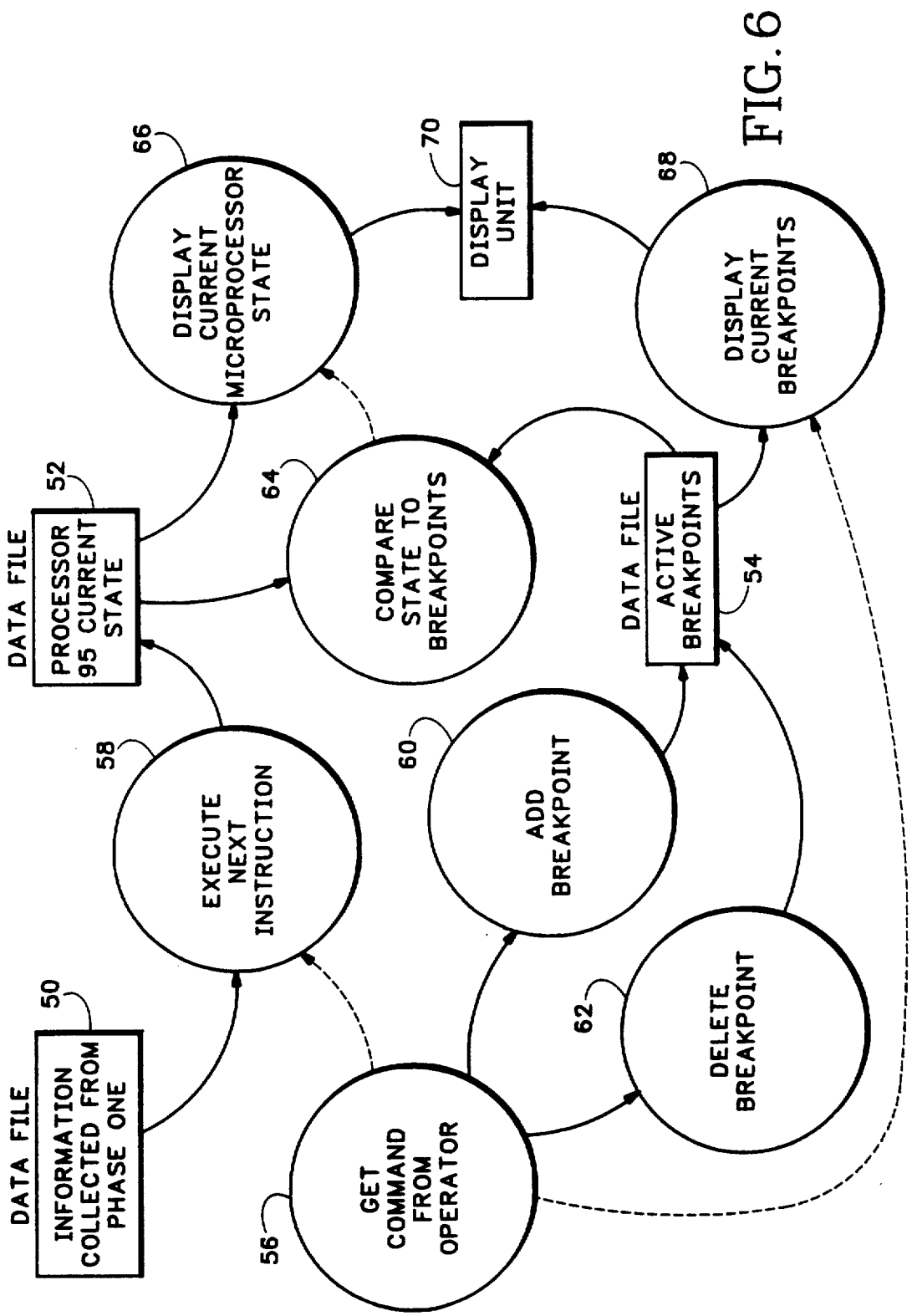
FIG. 6 illustrates a data flow diagram for Phase Two in accordance with the method and apparatus of the present invention.

While FIG. 5 broadly illustrates the operation of the method and apparatus in accordance with the present invention, a more detailed understanding may be obtained by considering FIG. 6. FIG. 6 is a data flow diagram, and serves to represent the major operations involved in the Phase Two data analysis process, as well as the relation among the various parts thereof. In this regard, it should be understood that the data flow diagram of FIG. 6 does not indicate the order of invocation of any process, nor is the data flow diagram intended to illustrate either initialization of data files or sequence of events. In particular, the data flow diagram of FIG. 6 illustrates the major modules of the apparatus and method in accordance with the present invention, the data files employed, and the flow of data and control information among the various modules. It is further understood that while certain operations are illustrated in particular in FIG. 6, especially with respect to the operations of Debugger 46 (FIG. 5), as will be more fully described hereinafter, it is to be understood that other operations may likewise similarly be included, as would be apparent to one of ordinary skill in the art. Consequently, the particular operations illustrated in FIG. 6 are not to be interpreted as limiting the invention thereto. Referring to FIG. 6, Information Collected From Phase One Data File 50 indicates broadly the information collected from Phase One, previously discussed. Processor's Current State Data File 52 indicates the data used to represent the current simulated internal state of Microprocessor 10, hereinafter referred to as simulated Microprocessor 10, as will be more fully discussed herein. Active Breakpoints Data File 54 contains the information regarding breakpoints, i.e. conditions at which point the internal status of simulated Microprocessor 10 is of particular interest. In this regard it is understood that there may be many different types of breakpoints, depending upon the conditions of interest with respect to Microprocessor System Under Development 30 (FIG. 2). By way of illustration, a breakpoint could represent the occurrence of a particular event with respect to Microprocessor System Under Development 30, as indicated by Information Collected From Phase One Data File 50. Such events could include the reading or writing from a particular address in the memory associated with simulated Microprocessor 10. In a similar fashion, a breakpoint could represent the occurrence of a particular condition internal to simulated Microprocessor 10. Such events could include, by way of illustration, the existence of a predefined condition within a register contained in simulated Microprocessor 10. In yet further addition to the foregoing, a breakpoint could likewise be defined as a logical combination of conditions, e.g., coincident with the reading from a particular address, the presence of a particular value in a selected register within simulated Microprocessor 10.

The foregoing are but a few of the breakpoint conditions possible with the apparatus and method of the present invention, and are given by way of illustration. Consequently, the foregoing illustrations are not to be considered as limiting the present invention, as many other breakpoint conditions would be apparent to one of ordinary skill in the art. Module 56, Get Command From Operator, functions to provide the necessary interface with an operator of the apparatus in accordance with the present invention. In particular, Module 56 provides a means for an operator to affect the simulation of instructions. In addition, Module 56 provides the means for an operator to either add, delete, or display selected breakpoints, as will be more fully discussed hereinafter. Module 58, Execute Next Instruction, represents the function of Simulator 48 (FIG. 5) by simulating the execution of instructions and determining the resulting effect on the internal status of simulated Microprocessor 10 as reflected in the Processor's Current State Data File 52. Module 60, Add Breakpoint, serves to add a selected breakpoint to the collection of breakpoints as reflected in Active Breakpoints Data File 54. In a similar manner, Module 62, Delete Breakpoint, functions to delete a selected breakpoint from the collection of aforementioned breakpoints, as reflected in Active Breakpoints Data File 54. Module 64, Compare State To Breakpoints, functions to monitor Processor's Current State Data File 52, and Active Breakpoints Data File 54, and to report the occurrence of the condition wherein the current state of simulated Microprocessor 10 matches a breakpoint contained in Active Breakpoints Data File 54. Module 66, Display Current Microprocessor State, functions to display the current simulated state of Microprocessor 10. Module 68, Display Current Breakpoints, functions to display the current collection of active breakpoints. Display Unit 70 functions to display either the current state of simulated Microprocessor 10, as contained in Processor's Current State Data File 52, or the current active breakpoints.

The foregoing described modules are related in the following manner. Module 56, Get Command From Operator, interfaces with Module 58, Execute Next Instruction, and Module 68, Display Current Breakpoint, by control. In particular, the operations of Modules 58 and 68 are performed in response to control information from Module 56. In this regard, control information comprises information defining a desired task, e.g., to execute the next instruction with respect to Execute Next Instruction 58, or to display current breakpoints with respect to Display Current Breakpoints 68. Module 60, Add Breakpoint, and Module 62, Delete Breakpoint, interface with Module 56 by the flow of information therebetween. In particular, Module 60 and Module 62 receive information from Module 56 in the form of breakpoints to either add to or delete from Active Breakpoints Data File 54. It will be noted that the relation between Module 56 and Modules 60 and 62 differs from the relation between Module 56 and Modules 58 and 68 in that the former requires not only the entering of the appropriate command to invoke the desired operation, i.e. Add Breakpoint with respect to Module 60 or Delete Breakpoint with respect to Module 62, but further requires additional information with respect to the specification of a particular breakpoint. Module 58 interfaces with Information Collected From Phase One Data File 50 through the flow of information therefrom. Module 58 functions to simulate the execution of a single instruction by Microprocessor 10, and to thereafter update the current state of simulated Microprocessor 10 by storing the resulting information representative of the current state of simulated Microprocessor 10 in Processor's Current State Data File 52. Modules 60 and 62, Add Breakpoint and Delete Breakpoint, respectively, both interface with Active Breakpoints Data File 54 by the flow of information from Modules 60 and 62 to Data File 54. Module 64, Compare State To Breakpoints, interfaces with Processor's Current State Data File 52 and Active Breakpoints Data File 54 through the flow of information from the respective data files to Module 64. In particular, as Module 64 functions to continuously monitor the current state of simulated Microprocessor 10 as reflected in Processor's Current State Data File 52, and compare the information contained therein with the current set of breakpoints, as contained in Active Breakpoints Data File 54. Module 64 interfaces with Module 66, Display Current Microprocessor State, by control information to direct Module 66 to display the current state of simulated Microprocessor 10 as reflected in Processor's Current State Data File 52, upon the occurrence of a condition within simulated Microprocessor 10 which agrees with an active breakpoint contained within Data File 54. Module 66, Display Current Microprocessor State, interfaces with Display Unit 70 by the flow of information. In particular, Module 66 interfaces with Display Unit 70 by providing the information representative of the current state of simulated Microprocessor 10 as reflected by information contained in Processor's Current State Data File 52, formatted for display by Display Unit 70. In a similar manner, Module 68 interfaces with Display Unit 70 by providing the information representative of active breakpoints as reflected by information contained in Active Breakpoints Data File 54, formatted for display by Display Unit 70.

Figure 7B:
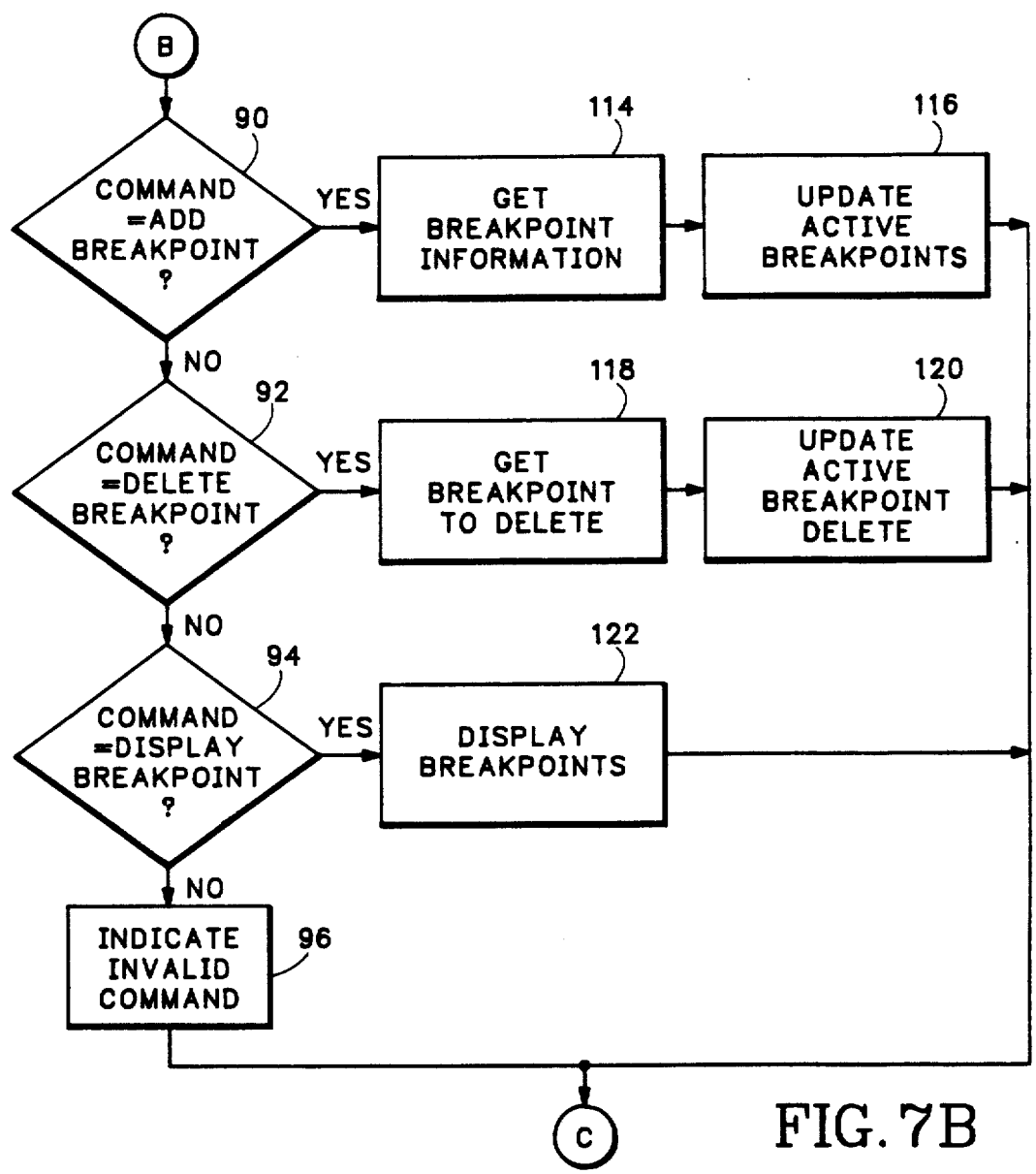
FIG. 7 illustrates in a flow chart format in FIGS. 7A, 7B and 7C the sequential operations comprising Phase Two.
Figure 7C:
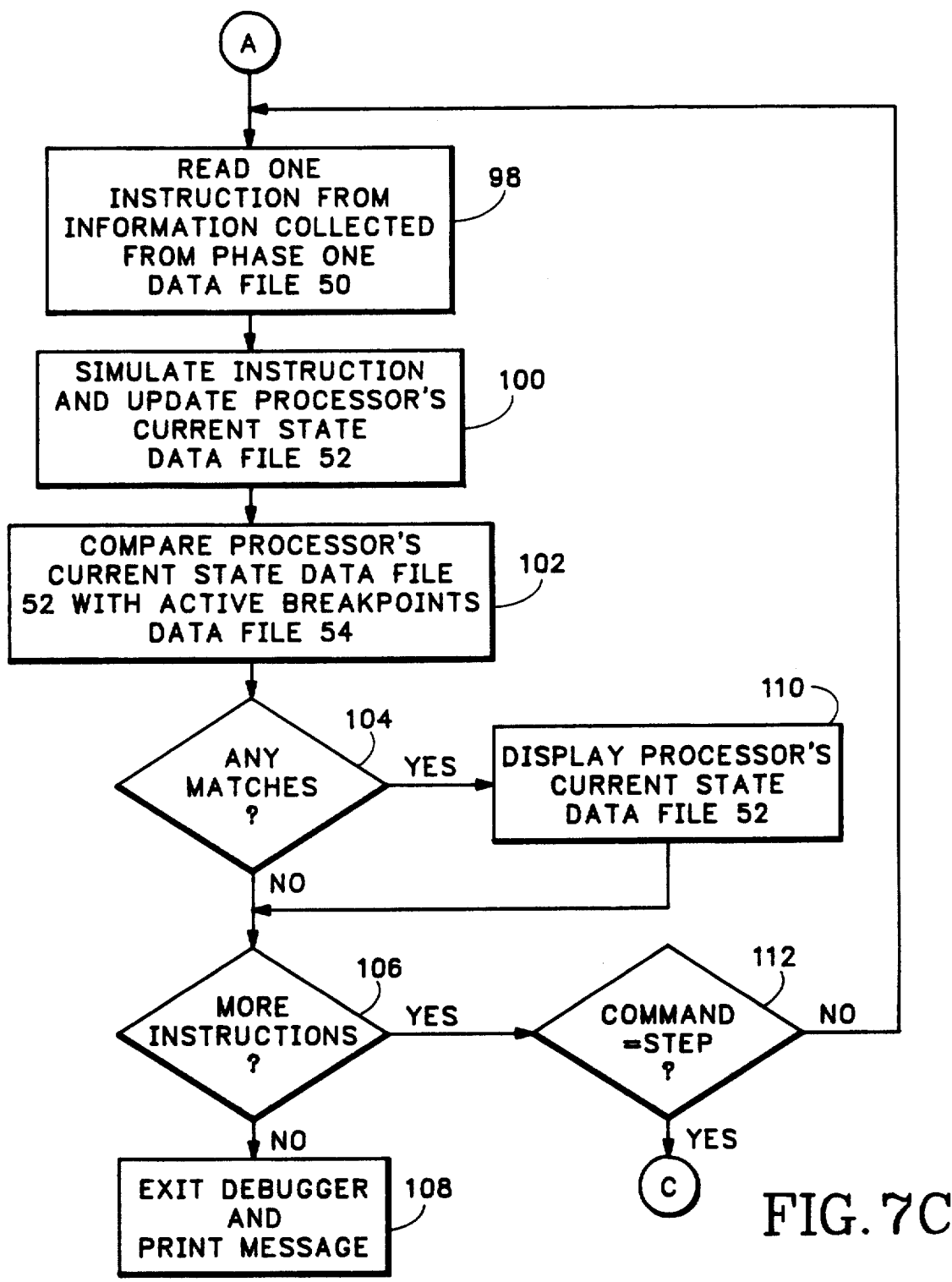

The sequential operation of the foregoing is illustrated in FIGS. 7A, 7B and 7C. Referring to FIG. 7A, the process initially begins with block 80 wherein Processor's Current State Data File 52 (FIG. 6) is first initialized. Block 80 functions to initialize Processor's Current State Data File 52 to correctly reflect the initial state Microprocessor System Under Development 30 (FIG. 2) would begin operation from. While the particular state Microprocessor System Under Development 30 (FIG. 2) would begin operation from would be application dependent, in the preferred embodiment this state is defined to be the particular internal state within Microprocessor 10 (FIG. 1) resulting from the application of a reset signal thereto. Thereafter in block 82 Active Breakpoints Data File 54 is likewise initialized to reflect the absence of breakpoints. This step is necessary to ensure that Data File 54 will initially not contain invalid information. Thereafter the operator is queried for a command in block 84. This corresponds to Get Command From Operator 56 of FIG. 6. Thereafter in block 86, a determination is made if the command received from the operator in block 84 was a STEP command. A STEP command results in the simulation of a single instruction, as will be more fully discussed hereinafter. If the command from the operator was not a STEP command, thereafter in block 88 a determination is made if the command received from the operator in block 84 was a GO command. A GO command results in the simulation of more than a single instruction, as will be more fully discussed hereinafter. It should be noted that a STEP and a GO command differ in the number of instructions which are simulated by the apparatus and method of the present invention, as will be more fully discussed hereinafter. If the command from the operator was not a GO command, thereafter in block 90 (FIG. 7B) a determination is made in block 90 if the command received from the operator in block 84 was an ADD BREAKPOINT command, as will be more fully discussed hereinafter. If the command from the operator was not an ADD BREAKPOINT command, thereafter in block 92 a determination is made if the command received from the operator in block 84 was a DELETE BREAKPOINT command, as will be more fully discussed hereinafter. If the command from the operator was not a DELETE BREAKPOINT command, thereafter in block 94 a determination is made if the command received from the operator in block 84 was a DISPLAY BREAKPOINT command. If the command from the operator was not a DISPLAY BREAKPOINT command, thereafter in block 96 a message is displayed on display unit 70 (FIG. 6) that the command entered by the operator was an invalid command. Thereafter, the foregoing described process is repeated beginning with block 84, Get Command From Operator. Referring once again to block 86, if the command received from the operator in block 84 was a STEP command, then block 98 (FIG. 7C) is next performed. In block 98 one instruction is read from Information Collected From Phase One Data File 50. This operation results in the flow of information from Information Collected from Phase One Data File 50 to Execute Next Instruction 58 (FIG. 6). Thereafter the execution of the instruction obtained in block 98 is next simulated in block 100 by Simulator 48 (FIG. 5), and the result of the simulation is used to up-date Processor's Current State Data File 52. This operation results in the flow of information from Execute Next Instruction 58 to Processor's Current State Data File 52 (FIG. 6). Thereafter, the information contained in Processor's Current State Data File 52 is compared with the information contained in Active Breakpoints Data File 54 in block 102. This operation results in the flow of information from Processor's Current State Data File 52 and Active Breakpoints Data File 54 to Compare State to Breakpoints 64 (FIG. 6). Thereafter, a determination is made in block 104 (FIG. 7C) if the current state of simulated Microprocessor 10 matches any of the previously defined breakpoints. If the current state of simulated Microprocessor 10 does not match any of the previously defined breakpoints, the function discussed with respect to block 106 as more fully discussed hereinafter is next performed. If the simulated state of simulated Microprocessor 10 does match one or more of the previously defined breakpoints, then the current state of simulated Microprocessor 10 as contained in Processor's Current State Data File 52 is displayed by block 110. This operation results in the flow of control from Compare State to Breakpoints 64 to Display Current Microprocessor state 66 (FIG. 6), and the subsequent flow of information from Processor's Current State Data File 52 to Display Current Micorprocessor State 66, and the further flow of information from Display Current Microprocessor State 66 to Display Unit 70. Thereafter, the function of block 106 is performed. In this regard it is understood that the function of block 106 is performed subsequent to either the function of block 104 or block 110, as determined by the operation of block 104 as previously discussed. In block 106 a determination is made if there are further instructions for execution contained in Information Collected From Phase One Data File 50. If there are not additional instructions, then thereafter in block 108 Debugger 46 (FIG. 4) is exited, and a message informing the operator that the foregoing process has terminated is displayed on Display Unit 70 (FIG. 6). It should be particularly noted that the foregoing described steps from block 98 to block 106 comprise the operations associated with the simulation of a single instruction according to the apparatus and method of the present invention. Consequently the simulation of more than a single instruction would be accomplished by the repeated performance of the foregoing described operations with respect to blocks 98 to block 106 as above discussed. Consequently, if the previous command was not a STEP command, as determined in block 112, then the foregoing process is again repeated beginning with block 98. If, however, the previous command was a STEP command, as determined in block 112, then the foregoing sequence is again repeated beginning with block 84 wherein the operator is queried for the next instruction. Referring to block 88 (FIG. 7A), if the command received from the operator in block 84 was a GO command, then the foregoing discussed sequence beginning with block 98 will be repeatedly performed as above described, until there are no further instructions to simulate, as determined in block 106. Thereafter the foregoing process will terminate with the operations of block 108 as previously discussed. Referring once again to block 90 (FIG. 7B), if the command received from the operator in block 84 was an ADD BREAKPOINT command, then breakpoint information is obtained from the operator in block 114. Thereafter in block 116 Active Breakpoints Data File 54 is updated to include the new breakpoint. This operation results in the flow of information from Get Command From Operator 56 to Add Breakpoint 60 (FIG. 6), and the subsequent flow of information from Add Breakpoint 60 to Active Breakpoints Data File 54. Thereafter, the foregoing described process is repeated beginning with Get Command From Operator in block 84. Referring to block 92, if the command from the operator was a DELETE BREAKPOINT command, then the information regarding the breakpoint to delete is obtained from the operator in block 118. Thereafter in block 120 Active Breakpoints Data File 54 is updated to delete the desired breakpoint. This operation results in the flow of information from Get Command From Operator 56 to Delete Breakpoint 62 (FIG. 6), and the subsequent flow of information from Delete Breakpoint 62 to Active Breakpoints Data File 54. Thereafter, the foregoing described process is repeated beginning with Get Command From Operator in block 84. Referring to block 94, if the command from the operator was DISPLAY BREAKPOINT, then the active breakpoints contained in Active Breakpoints Data File 54 are displayed on Display Unit 70 in block 122. This results in the flow of control from Get Command From Operator 56 to Display Current Breakpoints 68 (FIG. 6), and the subsequent flow of information from Active Breakpoints Data file 54 to Display Current Breakpoints 68, and the further subsequent flow of information from Display Current Breakpoints 68 to Display Unit 70. Thereafter, the foregoing described process is repeated beginning with Get Command From Operator in block 84.

Consequently it is observed that the foregoing has described a method and apparatus for determining the internal state of a processor without disturbing the operational environment associated therewith. While the foregoing description has been with respect to a particular embodiment of the method and apparatus of the present invention, other embodiments differing from the foregoing would be apparent to one of ordinary skill in the art. Consequently the method and apparatus of the present invention are to be considered limited only by the following claims.

I claim:

1. Apparatus for determining conditions internal to a processor from information descriptive of the processor and from activities of the processor during the execution of a known set of instructions comprising:
   means coupled to the processor for monitoring and recording the activities of the processor during the execution of the known set of instructions; and
   means responsive to the information descriptive of the processor and to the recorded activities of the processor during the execution of the known set of instructions for simulating conditions internal to the processor during the execution of the known set of instructions by a re-execution of the program guided by the recorded activities to determine the conditions internal to the processor at each setup of the known set of instructions.

2. Apparatus as recited in claim 1 further comprising: re-execution of the known program guided by the recorded address, data and control signals and by the information descriptive of the processor to determine the conditions internal to the processor at each step of the known program.

3. Apparatus as recited in claim 1, further comprising:
   selection means responsive to information from an operator, for defining a plurality of status conditions;
   control means responsive to said simulation means and said selection means for determining the occurrence of a simulated status according to one of the plurality of defined status conditions.

4. A method for determining a status of a processor from information descriptive of the processor and from externally available address, data and control signals produced during an original execution of a program by the processor, comprising the steps of:
   monitoring the externally available address, data and control signals produced during the original execution of the program by the processor;
   recording the externally available address, data and control signals produced during the original execution of the program by the processor; and,
   simulating the status of the processor during the original execution of the program by a re-execution of the program guided by the recorded externally available address, data and control signals and the information descriptive of the processor.

5. A method as recited in claim 4 further comprising the steps of:
   defining a specific internal condition; and
   determining the occurrence of a simulated internal condition equivalent to the specific internal condition and for displaying the conditions internal to the processor at that point.

6. A method as recited in claim 4 further comprising the steps of:
   defining a set of specific internal conditions; and
   determining the occurrence of a simulated internal condition equivalent to one of the set of specific internal conditions and for displaying the conditions internal to the processor at that point.

* * * * *